US011455644B2

(12) United States Patent
Bangalore et al.

(10) Patent No.: US 11,455,644 B2
(45) Date of Patent: Sep. 27, 2022

(54) DYNAMIC GOVERNANCE OF EXPOSING INQUIRIES AND NOTIFICATIONS AT CLIENT DEVICES

(71) Applicant: Microsoft Technology Licensing, LLC, Redmond, WA (US)

(72) Inventors: Ramesh T. Bangalore, Redmond, WA (US); Charles D. McClintock, Bellevue, WA (US); Sushma Ashwin Rao, Snoqualmie, WA (US); Neelanjana Sachdev, Redmond, WA (US); Dhruv Malhotra, Redmond, WA (US); Scott Garrett Thompson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1266 days.

(21) Appl. No.: 15/803,684

(22) Filed: Nov. 3, 2017

(65) Prior Publication Data
US 2019/0139062 A1 May 9, 2019

(51) Int. Cl.
*G06Q 30/02* (2012.01)
*G06F 9/451* (2018.01)
(Continued)

(52) U.S. Cl.
CPC ........... *G06Q 30/0203* (2013.01); *G06F 8/38* (2013.01); *G06F 9/453* (2018.02);
(Continued)

(58) Field of Classification Search
CPC .... G06Q 30/0203; G06Q 30/02; G06F 9/453; G06F 8/38; G06F 11/3438; H04M 3/5233; H04M 15/852
(Continued)

(56) References Cited

U.S. PATENT DOCUMENTS 7,293,201 B2 11/2007 Ansari
7,310,350 B1 12/2007 Shao et al.
(Continued)

FOREIGN PATENT DOCUMENTS

WO WO-2005065252 A2 * 7/2005 .......... G06F 11/0709
WO 2016160640 A1 10/2016
WO 2018204031 A1 11/2018

OTHER PUBLICATIONS (Registry of Professional Vocational Evaluators Application Guide), RPVE Application Guide, 2013, pp. 1-13 (Year: 2013).*
(Continued)

*Primary Examiner* — Romain Jeanty
(74) *Attorney, Agent, or Firm* — Newport IP, LLC; Jacob P. Rohwer

(57) ABSTRACT

A system to obtain multiple feedback inquiries associated with an application and to ensure that at least a minimum duration passes between successive inquiries being shown to a user. The system may receive dynamic inquiries from an inquiry server that is external to the client device running the application and also receive static inquiries included within computer code of the application. The system may order (e.g., rank) the multiple inquiries according to priority to generate a prioritized inquiry sequence. The system may then refrain from exposing low priority inquiries if higher priority inquiries have yet to be exposed to solicit user input. Individual inquiries can include a classifier to enable the system to determine associations between discrete inquiries and to govern a rate at which groups of associated inquiries are shown to a user.

20 Claims, 8 Drawing Sheets

(51) Int. Cl.
*G06F 8/38* (2018.01)
*G06F 11/34* (2006.01)
*H04M 3/523* (2006.01)
*H04M 15/00* (2006.01)

(52) U.S. Cl.
CPC ......... *G06F 11/3438* (2013.01); *G06Q 30/02* (2013.01); *H04M 3/5233* (2013.01); *H04M 15/852* (2013.01)

(58) Field of Classification Search
USPC ....................................................... 705/7.32
See application file for complete search history.

(56) References Cited

U.S. PATENT DOCUMENTS

| | | | |
|---|---|---|---|
| 7,996,723 | B2 | 8/2011 | Levine et al. |
| 8,271,951 | B2 | 9/2012 | Brugler et al. |
| 8,515,803 | B2 | 8/2013 | Meyer et al. |
| 8,924,935 | B1 | 12/2014 | Chopra et al. |
| 9,189,317 | B1 | 11/2015 | Marimuthu |
| 9,201,960 | B2 * | 12/2015 | Singh ................... G06F 16/951 |
| 9,405,825 | B1 | 8/2016 | Kuznetsova et al. |
| 9,471,594 | B1 | 10/2016 | Schnegelberger et al. |
| 2002/0118220 | A1 | 8/2002 | Lui et al. |
| 2004/0210899 | A1 | 10/2004 | Somogyi |
| 2007/0061374 | A1 * | 3/2007 | Inakawa ............. G06K 15/002 |
| 2008/0288271 | A1 | 11/2008 | Faust |
| 2008/0294743 | A1 * | 11/2008 | Kato ..................... G06Q 10/10 709/207 |
| 2012/0101952 | A1 * | 4/2012 | Raleigh ............... H04L 12/1417 709/223 |
| 2014/0019228 | A1 | 1/2014 | Aggarwal et al. |
| 2014/0108095 | A1 | 4/2014 | Tetreault et al. |
| 2014/0358636 | A1 | 12/2014 | Nowak et al. |
| 2015/0242593 | A1 | 8/2015 | Levenson et al. |
| 2015/0356578 | A1 | 12/2015 | Li |
| 2016/0029145 | A1 * | 1/2016 | Angiolillo .......... G06Q 30/0203 455/418 |
| 2016/0119477 | A1 | 4/2016 | Sharpe |
| 2016/0219398 | A1 | 7/2016 | Kamensky |
| 2016/0239374 | A1 | 8/2016 | Schnegelberger et al. |
| 2016/0330332 | A1 | 11/2016 | Celik et al. |
| 2017/0345417 | A1 | 11/2017 | Kennewick, Sr. |
| 2018/0336475 | A1 | 11/2018 | Chakra et al. |
| 2018/0357733 | A1 | 12/2018 | Valder et al. |
| 2020/0159837 | A1 | 5/2020 | Tiwari et al. |
| 2020/0183772 | A1 | 6/2020 | Bangalore et al. |

OTHER PUBLICATIONS

"Non Final Office Action Issued in U.S. Appl. No. 16/215,074", dated Jun. 26, 2020, 32 Pages.
"International Search Report and Written Opinion Issued in PCT Application No. PCT/US19/064085", dated May 4, 2020, 12 Pages.
"Final Office Action Issued in U.S. Appl. No. 16/215,074", dated Oct. 16, 2020, 28 Pages.
Harley, Nick, "How Error Monitoring Helps You Find Bugs BEFORE Users Do", Retrieved from: https://scotch.io/bar-talk/how-error-monitoring-helps-you-find-bugs-before-users-do. Retrieved Date: Oct. 10, 2018, 7 Pages.
"International Search Report and Written Opinion Issued in PCT Application No. PCT/US2018/057903", dated Jan. 8, 2019, 13 Pages.
"Client-Side Survey Control—Application as filed in U.S. Appl. No. 15/471,391", filed Mar. 28, 2017, 22 Pages.
"Office Action Issued in European Patent Application No. 18804174.3", dated Apr. 25, 2022, 7 Pages.

* cited by examiner

Inquiry Data 400

| Inquiry Type | Inquiry ID | Threshold Criteria | Priority | Classifier | Triger Criteria | Cool-Off Duration | Inquiry Text | Potential Responses |
|---|---|---|---|---|---|---|---|---|
| Isolated Inquiry Data 402 | ID_1 | NONE | 10 No Ask Limit | 2 | Application Crash | None | Sorry about that. Can we collect some system data to help fix that issue? | Yes or No |
| | ID_2 | Apply Only When No Campaign Applies to Same User | 9 | 1 | User Action A | 45 Days | How are you liking the "Autosave" function? | Love it or dislike it or It's OK |
| | ID_3 | | 9 Ask 3X | 1 | User Action B | 30 Days | How are you liking the "Co-Authoring" function? | Love it or dislike it or It's OK |
| | ID_4 | | 3 | 1 | User Action C | 30 Days | How are you liking the "Show My Edits" function? | Love it or dislike it or It's OK |
| Campaign Inquiry Data 404 | C1_1 | Apply Probability Function 126 | 9 Sequence = 1st | N | Product Activation + 3 Days | 90 Days | We've noticed you've just started to use this application. Thanks for the purchase. How is your experience so far? | Scale of 1 = Poor to 2 = Great |
| | C1_2 | | 8 Sequence = Any but 1st or Last | N | Save 3 Files to Non-Cloud Folder # Asks = 1 | 45 Days | Looks like you've been saving documents locally. Did you know you have 5GB of free Cloud Storage? | Yes or No |
| | C1_3 | | 8 Sequence = Any but 1st or Last | N | Launch App with Single Seat Installed | 20 Hours of Application Use | We noticed you've only installed this application to this device. Have you considered sharing this application since you have 4 more license seats? | Yes or No |
| | C1_4 | | 9 Sequence = 1st or Last | N | Launch Non-Renewed 5 days to Expiration | NA – Campaign Over | Hello, we noticed you are nearing the end of your license term. Is there anything we can do to assist you at this time? | Yes or No or Renew My Subscription |

FIGURE 4A

DYNAMIC GOVERNANCE OF EXPOSING INQUIRIES AND NOTIFICATIONS AT CLIENT DEVICES

BACKGROUND

Some software applications include a variety of components for facilitating a wide range of functionalities. It is often desirable to solicit user feedback with respect to these components to continuously improve the functionalities and associated user experience. Some applications are configured to expose user surveys in response to a user performing certain triggering activities. In this way, feedback can be solicited while the user's experience with related components remains fresh in their memory.

In many cases, some application components are logically discrete with respect to one another. When triggering activities occur, therefore, such applications cannot discern whether a user has recently been shown a survey soliciting user input in association with the other components. Unfortunately, this may lead to user dissatisfaction as a user becomes overwhelmed with frequent surveys soliciting user input within a short period. For example, upon first installing an application it is common for a user to try out the application's available functionalities. As the user tries one functionality and then another, the user's initial impression of the application may be negative due to the user's activity triggering too many surveys. In addition, some applications are also unaware of feedback inquiries that are displayed by other applications. Such activity can exacerbate the above-described problems since different applications may ask the same or similar questions, thus increasing the number of user interruptions.

Some applications can rely on external sources to provide survey content in real time. To implement such features, some productivity applications are configured to request survey content from remote sources (e.g., over a network) as triggering activities occur locally on a client device. Such implementations are ineffective at promptly soliciting user feedback absent an active internet connection.

It is with respect to these and other considerations that the disclosure made herein is presented.

SUMMARY

Technologies described herein enable a system to dynamically govern the frequency of feedback inquiries that are displayed to a user operating a client device. Generally described, embodiments described herein enable a system to obtain multiple inquiries associated with an application and to ensure that at least a minimum duration passes between successive inquiries being shown to a user. In some implementations, the system can receive dynamic inquiries from an inquiry server that is external to the client device and also receive static inquiries included within computer code of the application. The inquiries can be associated with trigger criteria defining user activity that triggers the display of an individual inquiry to a user. The system then monitors user activity of a computer. When the user activity satisfies the trigger criteria associated with an inquiry, the system governs the display of the inquiry based on one or more conditions. For example, the system may then refrain from exposing low priority inquiries if higher priority inquiries have yet to be exposed to solicit user input. In other examples, the system may restrict the display of an inquiry if a previous inquiry was displayed within a predetermined duration, if a system has exceeded a total number of displayed inquiries, or if a frequency of inquiries has reached a threshold. The system can implement a "cool off" duration to govern the frequency with which inquiries are displayed to a user. As will be described in more detail below, classifiers, e.g., channels, of inquiries can be used to govern inquiries associated with a number of different inquiry categories. In addition, inquiry priorities, expiration dates, an experience level of a user, and other metadata related to individual inquiries can be used to govern when inquiries are displayed to a user. Campaigns can be defined to present a series of inquiries to a user in a coordinated manner. Campaigns can govern the display of inquiries by the use of an expiration date for campaign, a total number of inquiries for a campaign, a cool off period related to a campaign, and other governing parameters. In addition, the techniques disclosed herein enable a system to govern the display of inquiries related to different components of an application and govern the display of inquiries across different applications.

In some implementations, individual inquiries can include a classifier to enable the system to determine associations between discrete inquiries and to govern a rate at which groups, e.g., classes, of associated inquiries are shown to a user. For example, each inquiry may be marked with a classifier that is selected from a predetermined classifier set (e.g., a number between one ("1") and four ("4"). Then, when a particular inquiry is triggered and shown to a user, the system may identify the classifier for that inquiry and prevent other inquiries that are marked with the same classifier from being shown for a predetermined duration of time (e.g., regardless of whether trigger criteria for the other inquiries are met).

In a more specific example, the multiple inquiries may include a first inquiry having first trigger criteria and a second inquiry having second trigger criteria, wherein each of the first inquiry and the second inquiry are "marked" with a classifier value of two ("2"). Then, if the first trigger criteria are satisfied, the system may show the first inquiry to the user and then refrain from showing the second inquiry for the predetermined period of time even if the second trigger criteria are met within that period. The predetermined period of time may be thought of as a "cool-off" duration in which the system prevents the user from being disturbed by additional inquiries.

In various implementations, a system may enable a client device to govern activation of an inquiry without immediate (e.g., real-time) control of remote servers, such as an inquiry server. Accordingly, once configured, the system enables the client device to independently govern activation of the inquiry user experience even when not connected to the Internet. As used herein, the term "inquiry user experience" may refer generally to any computing action that is perceptible to a user and suitable for soliciting user input of any type from the user. Exemplary inquiry user experiences include, but are not limited to, displaying a pop-up survey to the user that asks the user a question and includes one or more user interface elements for the user to provide feedback, displaying a pop-up notification that informs the user of some aspect of an application (e.g., "Hi, did you know you can use this feature to perform these other functions too?"), or any other user experience that may attract a user's attention to solicit user input (e.g., user feedback and/or permission to collect system data) and/or provide information to the user.

The disclosed technologies represent a substantial advantage over existing techniques for triggering inquiry exposures which automatically and indiscriminately expose inquiries to users based on predefined user actions (e.g., using an application feature for a first time) regardless of whether user input has recently been solicited from the same user via another unrelated inquiry. Among many other benefits, the techniques herein improve efficiencies with respect to a wide range of computing resources. For instance, human interaction with a device may be improved as the use of the techniques disclosed herein enable a user to freely utilize an application without being overwhelmed with frequent inquiries (e.g., surveys) soliciting user input within a short period. In addition, improved human interaction improves other computing resources such as processor and network resources, e.g., exposing inquires less frequently reduces network traffic and computer cycles as opposed to exposing inquiries more frequently. Technical effects other than those mentioned herein can also be realized from implementations of the technologies disclosed herein.

As used herein, the term "dynamic inquiry" may refer generally to an inquiry that is associated with an application and that is transmitted to a client device after the application is installed onto the client device. For example, if an application is installed and operational on a client device at a particular time and then an inquiry is later generated remotely from the client device and transmitted to the client device, this inquiry may aptly be described as a dynamic inquiry. It can be appreciated that dynamic inquiries may be beneficial under circumstances where a software development team and/or a marketing team develops an interest in certain user input after an application is made commercially available.

As used herein, the term "static inquiry" may refer generally to an inquiry that is associated with an application and that is transmitted to a client device with the application (e.g., within computer code of the application). For example, if an inquiry exists on a client device and is accessible by a component of an application (e.g., an inquiry engine) by virtue of the application being installed and/or operational on the client device As used herein, the term "campaign" can refer to a series of inquiries that has a number of parameters for displaying user inquiries. Data defining a campaign can comprise an expiration date, a frequency in which questions can be displayed to a user, a total number of questions that can be displayed to a user, and other parameters. The system can display campaign questions based on trigger criteria associated with the campaign to enable a system to collect responses for coordinated inquiries. It can be appreciated that campaign inquiries may be beneficial under circumstances where a software development team and/or a marketing team has a continual interest in soliciting user input in a manner that remains constant over time. Such features also enable a system to manage and prioritize multiple long-running surveys within the application without overwhelming a user with multiple inquiries for the long-running surveys.

In an exemplary embodiment, a client device may govern a rate at which inquiries are shown to a user (e.g., to prevent a high volume of inquiries being shown) by obtaining inquiry data that defines numerous inquiries associated with an application. The inquiry data may define various parameters on an individual inquiry level. For example, the inquiry data may define, for individual inquiries, parameters that include, but are not limited to, priority data that is indicative of an importance of receiving user input in association with specific inquiries, trigger criteria associated with triggering exposure of specific inquiries to a user, and/or classifier data that marks specific inquiries with one or more of a predetermined set of classifiers.

In some implementations, the client device may include an inquiry engine that is configured to order (e.g., rank) the numerous inquiries into a prioritized inquiry sequence. For example, the inquiry engine may analyze the priority data that indicates the importance of receiving user input in association with specific inquiries to rank the inquiries (e.g., so that the highest importance inquiries take priority over lower importance inquiries). In implementations where the inquiry engine receives inquiries from multiple sources (e.g., dynamic inquiries from an external source and static inquiries that are built into an application), the inquiry engine may analyze and/or normalize priority data from each source and then combine inquiries from both sources into a single prioritized inquiry sequence.

User activity may then be monitored at the client device to determine when trigger criteria corresponding to individual inquiries has been satisfied. In some implementations, the inquiry engine may determine a priority set of inquiries (e.g., a select amount of high priority inquiries) from the prioritized inquiry sequence. Then, the system may monitor user activity with respect to only those inquiries included within the priority set. As one specific but nonlimiting example, the inquiry engine may select a top (e.g., high priority) portion of the prioritized inquiry sequence by selecting those inquiries having individual priorities that exceed a threshold priority level. The threshold priority level may correspond to being within the top "X" ranked inquiries (where "X" is a positive integer), being within a top percentage of inquiries, having a priority level not lower than any other inquiry within the prioritized sequence of inquiries, or any other suitable measure of a threshold priority level.

Responsive to the user activity satisfying trigger criteria for a particular inquiry, the system may identify a classifier associated with the particular inquiry and, optionally, show the particular inquiry to the user. Then, the system may prevent other inquiries that are associated with the same classifier as the particular inquiry from being shown to the user for a "cool-off" duration of time. For example, if the particular inquiry includes a classifier with a value of two ("2") and trigger criteria are met for some other inquiry also having a classifier value of two ("2"), then the system may ignore the other inquiry (or otherwise prevent it from being shown to the user) at least until the "cool-off" duration of time has passed.

As a more specific but nonlimiting example, the system may include multiple defined channels (e.g., paths or resources usable for activating an inquiry user experience to display an inquiry) and individual channels may be designated for exposing individual inquiries. Stated alternatively, each individual inquiry may include a classifier that designates which channel the system is to use to show that individual inquiry. When trigger criteria for a particular inquiry are satisfied and the system responds by exposing the particular inquiry via a designated channel, the system may then "lock" the designated channel for a predetermined duration of time to prevent other inquiries that designate this channel from being shown to the user. In this way, even if trigger criteria for the other inquiries are met within the predetermined duration, the user will be able to freely use the application for at least the predetermined duration without being shown another inquiry that designates the same channel as the previously shown inquiry.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

FIG. 4A illustrates exemplary inquiry data that is usable for governing a frequency at which inquiries are successively shown at a client device as trigger criteria are satisfied.

DETAILED DESCRIPTION

The following Detailed Description describes technologies that enable dynamic governance of a frequency at which inquiries are successively shown to a user at a client device as trigger criteria are satisfied for different ones of the inquiries. Generally described, embodiments described herein enable a system to obtain multiple inquiries associated with an application and to ensure that at least a minimum "cool-off" duration of time passes between successive inquiries being shown to a user. For example, since some users find spontaneous inquires to be distracting and/or aggravating, blocking subsequent inquiries for a duration of time allows the user to "cool-off" as opposed to being shown another inquiry too quickly which may further aggravate the user. In some implementations, the system may operate on the client device to receive numerous inquiries, of varying priority, from both local sources (e.g., inquiry data that is coded into an application) and also external sources (e.g., a server) that periodically send new inquiries to the client device. For example, the system can receive dynamic inquiries from an inquiry server that is external to the client device and static inquiries that are included within computer code of the application. The system may order the inquiries into a prioritized inquiry sequence and then expose only inquiries having at least a threshold priority level. For example, the system may select a priority set of inquires having priorities that exceed the threshold priority level. Then, the system may monitor user activity against trigger criteria for only the inquiries included within the priority set.

In some implementations, individual inquiries can include a classifier to enable the system to determine associations between discrete inquires and to govern a rate at which groups of associated inquiries (e.g., inquires with the same classifier value) are shown to a user. For example, each inquiry may be marked with a number within a predetermined range (e.g., a number between one ("1") and four ("4")). Then, when a particular inquiry is triggered and shown to a user, the system may identify the classifier for that inquiry to prevent other inquiries that are marked with the same classifier from being shown for a predetermined duration of time. As a more specific but nonlimiting example, the system may include multiple defined channels (e.g., paths or resources usable for activating an inquiry user experience to display an inquiry) and each individual inquiry may designate a specific channel to be used for showing that individual inquiry at the client device. When trigger criteria for a particular inquiry are satisfied causing the system to expose the particular inquiry via its designated channel, the system may then "lock" that channel for a predetermined duration of time to prevent other inquiries that designate that channel from being shown to the user.

Figure 1:
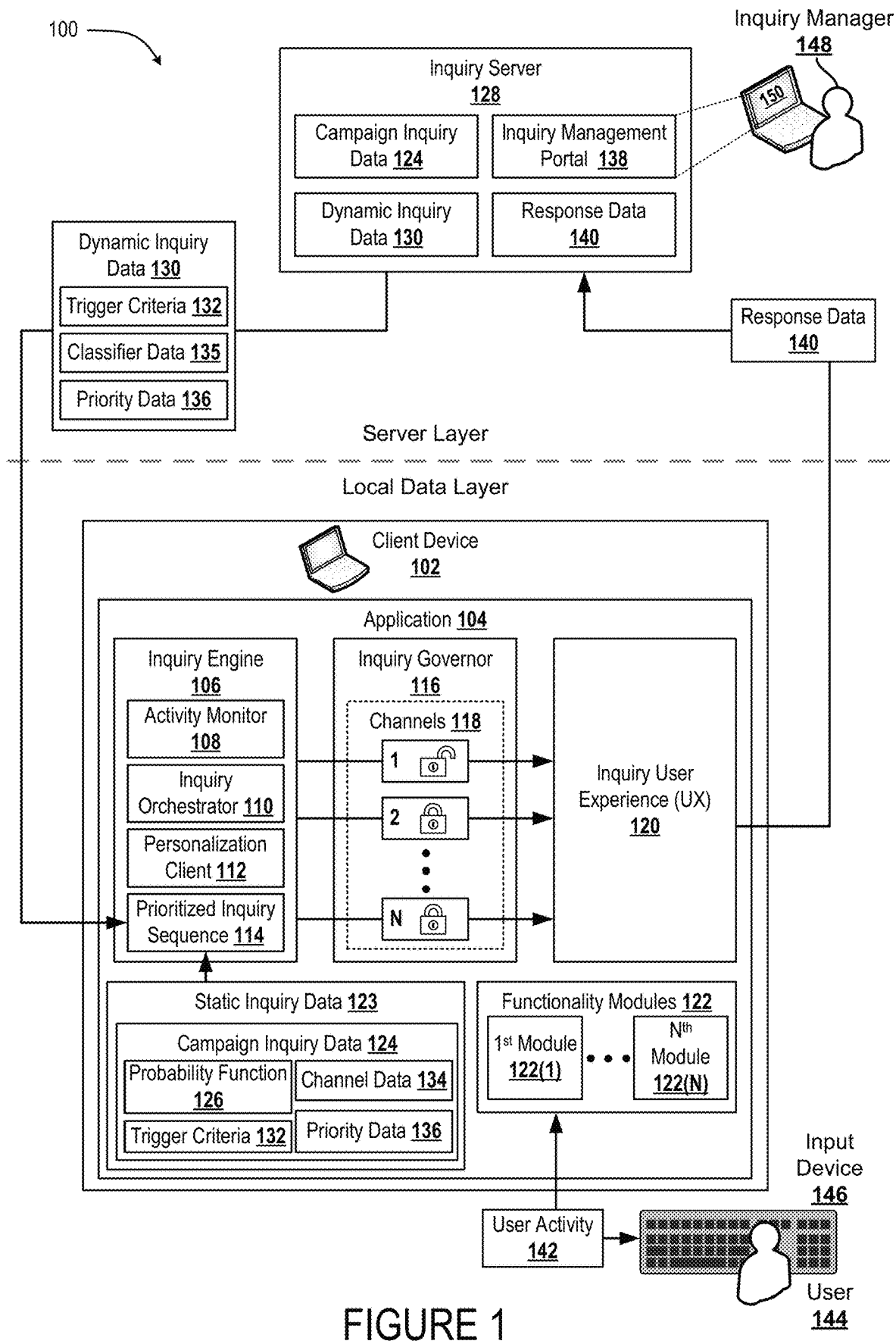
FIG. 1 illustrates an exemplary system for dynamically governing a frequency at which inquiries are successively shown at a client device as trigger criteria are satisfied for multiple ones of the inquiries.

Turning now to FIG. 1, illustrated is an exemplary system 100 for dynamically governing a frequency at which inquiries are successively shown at a client device 102 as trigger criteria 132 are satisfied for multiple ones of the inquiries. As illustrated, the client device 102 may include an application 104 that is operational at the client device 102. For example, the application 104 may be a client application (e.g., EXCEL and/or WORD by MICROSOFT, PAGES and/or NUMBERS by Apple, Inc.) that is installed onto the client device 102 and can be run at the client device 102 by an operating system. As another example, the application 104 may be a server application (e.g., GOOGLE DOCS and/or GOOGLE SHEETS) that is accessible at the client device 102 via a web portal (not shown). Although illustrated as a "laptop" style computing device, the client device 102 may be any other suitable computing device such as, for example, a desktop computer, a tablet computer, a smart phone, etc.

In some embodiments, the client device 102 may include an inquiry engine 106 for determining which inquiries should be shown to a user when corresponding trigger criteria are satisfied and an inquiry governor 116 for governing a frequency at which inquiries are shown to a user when user activity satisfies trigger criteria for numerous inquiries within a particular duration of time. For example, the inquiry governor 116 may govern a frequency at which the inquiry engine 106 may expose individual inquiries that are marked by the same classifier via an inquiry user experience 120 (e.g., a pop-up survey and/or notification).

In some embodiments, the inquiry engine 106 includes an activity monitor 108 for monitoring user activity 142 that occurs in association with the application 104. For example, while a user 144 is performing various activities with respect to the application 104 via an input device 146 (e.g., a keyboard, a mouse, a touchscreen, a microphone, or any other suitable input component), the activity monitor 108 may monitor the user activity 142 to determine whether trigger criteria have been satisfied for any particular inquiry. Based on the governing techniques described herein, in some instances trigger criteria for a particular inquiry being satisfied causes the particular inquiry to be shown to the user 144 whereas in other instances the same trigger criteria being satisfied for the same particular inquiry does not result in this inquiry being shown to the user 144.

In some embodiments, the inquiry engine 106 also includes an inquiry orchestrator 110 for ordering numerous inquiries into a prioritized inquiry sequence 114. As illustrated, the inquiry engine 106 may include inquiry data, that defines individual inquiries, from multiple sources. For example, the inquiry engine 106 may receive dynamic inquiries that are transmitted to the client device 102 from an inquiry server 128 in addition to static inquiries that are coded into the application 104. As illustrated, the dynamic inquiries are received as dynamic inquiry data 130 that is transmitted from the inquiry server 128 to the client device 102. The dynamic inquiry data 130 and/or the static inquiry data 123 may indicate for individual inquiries: trigger criteria 132 associated with triggering exposure of specific inquiries to the user 144; classifier data 134 that designates a specific channel 118 that is usable to pass a particular inquiry through the inquiry governor 116 for activating the inquiry user experience 120 (e.g., to show the particular inquiry); and/or priority data 136 that is indicative of an importance of receiving user input in association with specific inquiries. After receiving multiple inquiries in the dynamic inquiry data 130 and/or the static inquiry data 123, the inquiry engine 106 may then deploy the inquiry orchestrator 110 to consolidate and order (e.g., rank) the inquiries received from these discrete sources into a prioritized inquiry sequence 114.

As a more specific but nonlimiting example, the multiple inquiries may be individually assigned priority values ranging from one ("1") being the least important to ten ("10") being the most important. In this specific example, the inquiry orchestrator 110 may restrict exposure of inquiries having priorities below a threshold priority level such as, for example, the highest priority in the prioritized inquiry sequence 114. That is, if the prioritized inquiry set includes only three inquiries having a priority of nine and zero inquiries having a priority of ten, then the inquiry orchestrator 110 may cause the activity monitor 108 to evaluate trigger criteria with respect to only those three inquiries having the priority assignment of nine. In this way, even if trigger criteria are satisfied for other inquiries having a priority assignment of eight or below, the inquiry orchestrator 110 prevents these other inquiries from being shown to the user 144. For example, by virtue of these other inquiries having priority assignments of eight or below, the inquiry engine 106 may refrain from attempting to pass these other inquiries through the inquiry governor 116 to activate the inquiry user experience 120.

In some embodiments, the inquiry engine 106 may also include a personalization client 112 that analyzes user activity associated with the user 144 to personalize the prioritized inquiry sequence 114. For example, the personalization client 112 may analyze historical user activity of the user 144 to determine experience levels of the user 144 with respect to various functionality modules 122 of the application 104. Then, based on the relative experience levels between two or more functionality modules, the personalization client 112 may select certain inquiries for the user 144 over other inquiries. As a specific example, the personalization client 112 may determine that the user 144 is highly experienced with a particular functionality module 122 that is almost uniformly unknown to an average user of the application 104 but is extensively used by a select group of users having unique uses for the application 104. As a highly specific but nonlimiting example, the personalization client 112 may analyze historical user activity to determine that the user 144 uses the application almost exclusively for a powerful but rarely deployed "pivot table" functionality. It can be appreciated that under these unique circumstances, receiving input from the user 144 regarding the "pivot table" functionality may be relatively more valuable than receiving input from this user 144 regarding some other more generic functionality of the application 104 with which nearly any user of the application has extensive experience. Accordingly, the personalization client 112 may identify one or more inquiries that are designed specifically to solicit feedback with respect to the "pivot table" functionality and, ultimately, may bolster the priority of the user by providing one or more inquiries within the prioritized inquiry sequence 114 over other inquiries that are unrelated to the "pivot table" functionality. As a more specific but nonlimiting example, the dynamic inquiry data 130 may include a first inquiry associated with the "pivot table" functionality and having a relatively low priority of three ("3") and include numerous other inquiries that are completely unassociated with the "pivot table" functionality but have the relatively higher priority of ten ("10"). Under these circumstances, even though the other inquiries have a much higher priority than the first inquiry, the personalization client 112 may nevertheless alter the prioritized inquiry sequence 114 based on the experience level of the user with respect to the "pivot table" functionality (e.g., to prioritize the pivot table inquiry over the more general inquiries).

In some implementations, one or more aspects of the dynamic inquiry data 130 may override one or more aspects of the static inquiry data 123 and/or previously received dynamic inquiry data 130. For example, as a specific but non-limiting example, the static inquiry data 123 may define the campaign inquiry data 124 as illustrated. Then, after the application is installed on the client device 102, dynamic inquiry data 130 may be received that includes superseding campaign inquiry data 124 that overrides (e.g., renders obsolete) the original campaign inquiry data 124 that was present within the static inquiry data 123.

After deploying the inquiry orchestrator 110 and/or personalization client 112 to generate the prioritized inquiry sequence 114, the inquiry engine 106 then deploys the activity monitor 108 to monitor user activity 142 that the user 144 performs with respect to the application 104. Responsive to the user activity 142 satisfying trigger criteria 132 for a particular inquiry, the inquiry engine 106 may route the inquiry to an inquiry governor 116 which then identifies a classifier associated with the particular inquiry to determine whether to display the particular inquiry to the user 144 via an inquiry user experience 120. If the user has recently (e.g., within a predetermined "cool-off" duration) been shown a previous inquiry that is marked with the same classifier as the particular inquiry just triggered, the inquiry governor 116 may prevent the particular inquiry from also being shown to the user 144. For illustrative purposes, suppose that the predetermined "cool-off" duration is set to thirty ("30") days to prevent the user 144 from being shown more than one inquiry associated with a particular classifier within a thirty ("30") day window. Further suppose that a first inquiry that includes a classifier with a value of two ("2") is triggered and shown to a user on day one ("1") and that a second inquiry that includes a classifier with the same value of two ("2") is triggered on day twenty-nine ("29"). Under these circumstances, the inquiry governor 116 will restrict the second inquiry from being shown to the user 144 because the predetermined "cool-off" duration has yet to pass. Suppose then that the second inquiry is again triggered on day thirty-two ("32"). Under these circumstances, the inquiry governor 116 will allow the second inquiry to be shown to the user 144.

In some embodiments, the inquiry governor 116 may include multiple defined channels 118 that serve as paths or resources for exposing an inquiry to a user. As a more specific but nonlimiting example, the channels 118 may correspond to individual APIs that are accessible by the inquiry engine 106 to cause the application 104 to display a notification window that suddenly appears (e.g., pops up) upon particular trigger criteria 132 being satisfied. Under circumstances in which the inquiry governor 116 includes individual and defined channels 118, the aforementioned "classifiers" that individual inquiries are marked with (e.g., to enable the system to determine whether to display particular inquiries at any given instance in time) may be "channel designations" that designate which channel (e.g., resource or path) the inquiry engine 106 and/or inquiry governor 116 is to use to expose specific inquiries to the user 144. In some implementations, when trigger criteria 132 for a particular inquiry are satisfied causing that particular inquiry to be exposed to the user 144 via a designated channel, the inquiry governor 116 may then "lock" (e.g., disable or otherwise make temporarily and/or permanently unavailable) the designated channel to prevent other inquiries that designate this channel from being subsequently shown to the user 144. In the illustrated embodiment, the inquiry governor 116 includes a first channel that is locked and a second and N-th channel that are both currently locked. Thus, if trigger criteria are satisfied for an inquiry that designates the first or second channel, the inquiry governor 116 as illustrated would allow the inquiry to be shown to the user 144. In contrast, if trigger criteria are satisfied for a different inquiry that designates the N-th channel, the inquiry governor 116 as illustrated would restrict this different inquiry from being shown to the user 144.

The inquiry governor 116 may also be configured to track an amount of time having passed since locking a particular channel and subsequently unlock the particular channel after the "cool-off" duration has passed. For example, the inquiry governor 116 may be configured to automatically unlock channels thirty ("30") days after locking them. In some implementations, individual inquiries may indicate an amount of time to lock a designated channel. For example, a first inquiry that is designed to solicit a fairly large amount of user feedback (e.g., a long survey) may cause the inquiry governor 116 to lock its designated channel for a relatively longer time than a second inquiry that is designed merely to request permission to collect system data associated with the application 104.

In some embodiments, the inquiry data includes campaign inquiry data 124 that defines an inquiry campaign that includes a sequence of campaign inquiries that are designed for exposure in an at least partially predetermined order over a campaign duration. For example, the inquiry campaign may include four ("4") individual inquiries and data indicating which inquiry is to be shown first, which inquiry is to be shown last, and that the remaining two entries can be shown in either order. In some instances, the campaign inquiry data 124 may include a probability function 126 that can be deployed by the inquiry engine 106 to select individual users to run individual campaigns for. For example, the campaign inquiry data 124 may include a specific campaign that is intended to be run for one user per thousand users. As a more specific but nonlimiting example, the probability function 126 may cause the inquiry engine 106 to generate a random number between 0 and 1 with 4 significant figures. Then, under circumstances in which the random number generated for a particular user is less than "0.0010," the inquiry engine 106 may run the specific campaign for the particular user. In contrast, if the random number generated for the particular user is greater than "0.0010," the inquiry engine 106 may refrain from running the specific campaign for the particular user. The inquiry data can also define a campaign expiration date causing a system to restrict the display of any inquiry after the campaign expiration date has passed. The inquiry data can also define a campaign total causing a system to restrict the display of any inquiry after the system has displayed a number of inquiries beyond the campaign total.

In some implementations, the inquiry engine 106 may be configured to unlock a channel corresponding to a particular campaign when that campaign is selected for a particular user. For example, the particular campaign may initially designate a channel that is by default locked at the inquiry governor 116 so that trigger criteria being satisfied for individual inquiries within the particular campaign does not result in those inquiries being shown to users not selected for the campaign. Then, if and only if the particular campaign is selected for the user 144 will the inquiry governor 116 unlock a channel designated by that particular campaign. In some implementations, the inquiry engine 106 may be configured to lock one or more channels that are not designated by the particular campaign when that particular campaign is selected for the user 144.

In some implementations, the inquiry engine 106 may be configured to unlock one or more channels (e.g., that are locked by default) based on the personalization client 112 having analyzed user data to determine an experience level of the user 144 with respect to one or more functionality modules 122. For example, continuing with the example in which the user 144 is highly experienced with the "pivot table" functionality, suppose that a particular inquiry is designed to solicit highly specific feedback associated with this functionality such that only users that are highly experienced with "pivot tables" would understand the question being asked in the inquiry. Under these circumstances, the particular inquiry may designate a channel that is by default locked at the inquiry governor 116 and is only unlocked upon determining that a particular user is highly experienced with the subject matter of the particular inquiry.

As further illustrated, upon particular inquiries being shown to the user 144 and feedback being provided, the client device 102 may transmit response data 140 to the inquiry server 128. In various implementations, the inquiry server 128 may provide access to an inquiry management portal 138 that enables an inquiry manager 148 to generate dynamic inquiries and send those inquires to the client device 102. The inquiry management portal 138 may also enable the inquiry manager 148 to view the response data 140 associated with responses to inquiries. As illustrated, the inquiry server 128 may include an instance of the static inquiry data 123 that is coded into the application 104 to correlate responses provided in the response data 140 to inquiries defined in the static inquiry data 123.

In various implementations, the system 100 enables the client device 102 to independently and autonomously govern the frequency at which inquiries are successively shown to the user 144 as trigger criteria are satisfied for multiple ones of the inquiries. In particular, since the application 104 itself includes the inquiry engine 106 and the inquiry governor 116 at the client device 102, the techniques described herein provide a self-sufficient client-side software component that can function while the client device is off-line and can run multiple long-running survey campaigns without additional input (e.g. inquiry updates and/or additional inquiry definitions) from the inquiry server 128.

In various implementations, the application 104 may include a plurality of functionality modules 122 that enable the user 144 to perform a wide range of functionalities while using the application 104. For example, an individual functionality module 122 may enable a user to jointly edit a document with another user at a remote location via a co-authoring work session, while another individual functionality module 122 may enable the user to insert images (e.g., .jpg files) into a word processing document, whereas yet another individual functionality module 122 may facilitate autosave functionality to prevent system crashes from resulting in a user losing his or her work product. As illustrated, the application 104 includes a first functionality module 122(1) through an N-th functionality module 122(N). It can be appreciated that in many modern applications, individual ones of the functionality modules 122 may have little or no ability to communicate with other ones of the functionality modules 122. Thus, these modern applications are unable to discern when user activity associated with one functionality module triggers an inquiry only a short time after other user activity associated with a different functionality module has already triggered a previous inquiry. Stated alternatively, in modern applications having numerous inquiries with trigger criteria relating to discrete functionality modules, there is always a non-zero probability that a user will be shown an inquiry at any particular instance in time. In contrast to modern applications, the techniques described herein for routing all inquiries through the inquiry governor 116 enable the disclosed system to dynamically govern a frequency at which inquiries corresponding to discrete functionality modules are successively shown to a user regardless of how quickly trigger criteria are satisfied for multiple ones of the inquiries.

Figure 2:
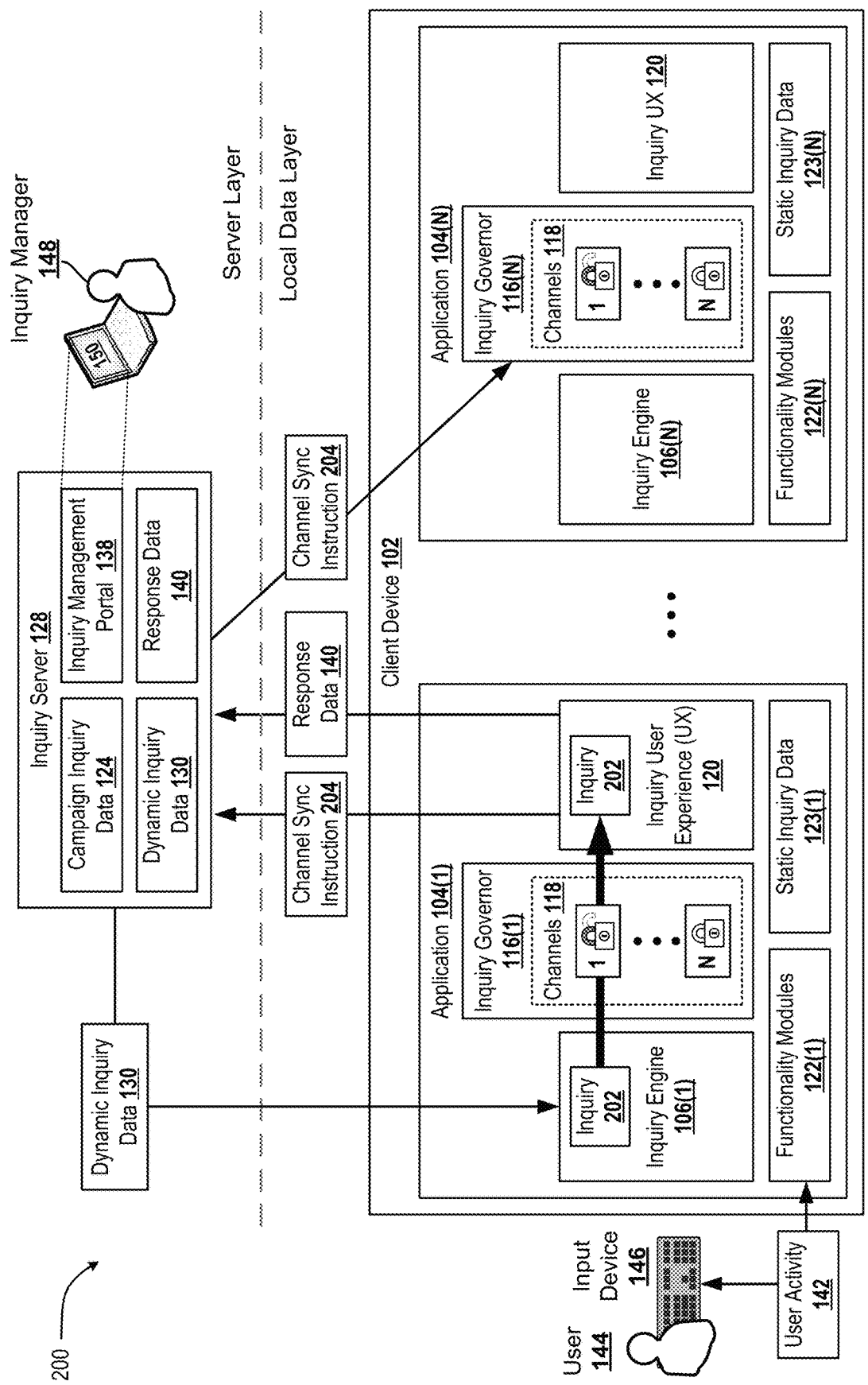
FIG. 2 illustrates an exemplary system for dynamically governing a frequency at which inquiries are successively shown to a user via two or more applications based on user activity that occurs within a single one of the applications.

Turning now to FIG. 2, illustrated is an exemplary system 200 for dynamically governing a frequency at which inquiries are successively shown to a user 144 via two or more applications 104 based on user activity that occurs within a single one of the applications 104. As illustrated, the client device 102 includes a first application 104(1) and an N-th application 104(N). Each of the applications 104 include various components discussed with relation to FIG. 1 such as, for example, an inquiry engine 106, an inquiry governor 116 having one or more channels 118, an inquiry user experience 120, and/or one or more functionality modules 122. As discussed with relation to FIG. 1, the inquiry engine 106 at any particular application 104 may obtain inquiry data that defines one or more inquiries and associated parameters (e.g., trigger criteria 132, classifier data 135, and/or priority data 136). It can be appreciated that FIG. 2 is similar to FIG. 1 with the exception that two or more applications 104 are shown to communicate with one another based on an inquiry 202 being triggered at one application 104 of the two or more applications 104 illustrated.

In particular, in the illustrated scenario the first inquiry engine 106(1) operates on the first client device 104(1) to analyze user activity 142 being performed with respect to one or more first functionality modules 122(1). Upon determining that trigger criteria have been satisfied for a particular inquiry 202, the particular inquiry 202 may be routed through a designated channel (i.e., channel 1 as illustrated in the first inquiry governor 116(1)) and exposed (e.g., audibly played and/or visibly shown) to the user 144. As a result of the particular inquiry 202 passing through the designated channel, the first inquiry governor 116(1) may lock the designated channel (i.e., at the first inquiry governor 116(1)) to prevent inquiries designating this channel from being exposed by the first application 104(1).

As an additional result of the particular inquiry 202 passing through the designated channel, the first inquiry governor 116(1) may generate and transmit a channel sync instruction 204 to an N-th inquiry governor 116(N) that resides on the N-th application 104(N). Responsive to the channel sync instruction 204, the N-th inquiry governor 116(N) may lock the designated channel with respect to the N-th application 104(N). It can be appreciated therefore that the user activity 142 that occurred via the input device 146 with respect to the first application 104(1) not only triggers governance of the frequency with which inquiries can be shown to the user 144 via the first application 104(1) but also triggers governance of the frequency with which inquiries can be shown to the user 144 via one or more other applications through which the user activity 142 was not received.

In some embodiments, the channel sync instruction 204 may be relayed through one or more servers such as, for example, the inquiry server 128 prior to reaching the N-th application 104(N). For example, it can be appreciated that under various circumstances the client device 102 may include an operating system that runs the applications 104 and includes trust parameters that prevent certain types of cross application communications. Accordingly, the first application 104(1) therefore may unable to communicate directly with the N-th application 104(N) but instead may send the channel sync instruction 204 to the inquiry server 128 which then identifies one or more application 104 which are intended recipients of the channel sync instruction 204. As illustrated, the inquiry server 128 ultimately relays the channel sync instruction 204 back to the N-th application 104(N) at the client device 102. In some implementations, the client device 102 and/or an operating system thereof may permit the first application 104(1) to communicate with the N-th application 104(N) without passing communications through any external server (e.g., the applications may "talk" with each other on the client device 102). Under these circumstances, the first application 104(1) may transmit the channel sync instruction 204 directly to the N-th application 104(N) on the client device 102, e.g., without passing the data across the local data layer.

It can be appreciated that the embodiment described in relation to FIG. 2 may be beneficial for deployment across multiple applications of a productivity suite that provisions a user 144 with access to multiple productivity applications based on the user's credentials (e.g., a user name and password combination and/or registration data associated with a user registering two or more applications from a productivity suite). Exemplary productivity suites include, but are not limited to, GOOGLE G-SUITE (e.g., which includes GOOGLE DOCS, GOOGLE SHEETS, GOOGLE SLIDES, etc.), ZOHO Office Suite, and/or MICROSOFT OFFICE (e.g., which includes MICROSOFT WORD, MICROSOFT EXCEL, MICROSOFT POWERPOINT, etc.).

Figure 3:
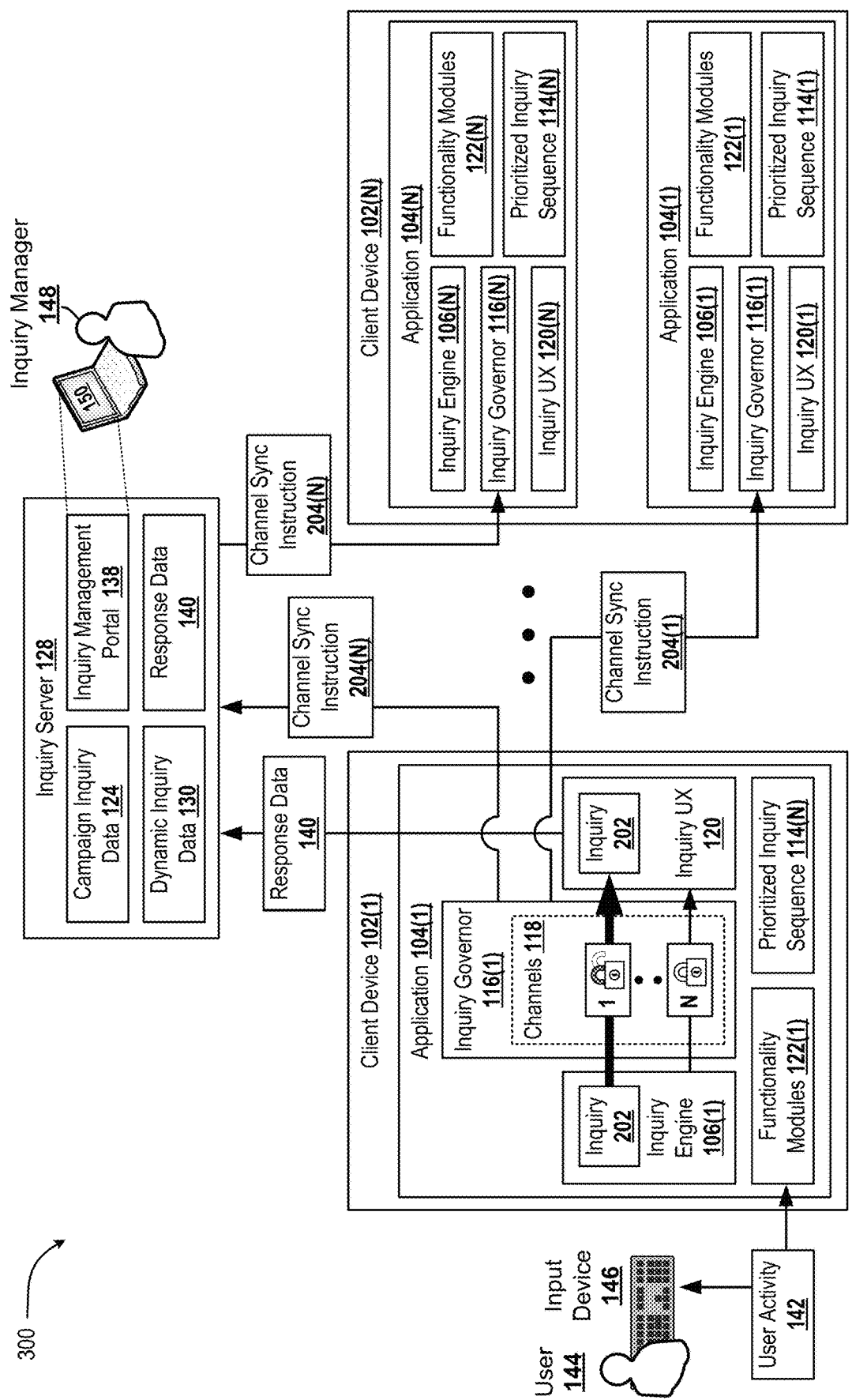
FIG. 3 illustrates an exemplary system for dynamically governing a frequency at which inquiries are successively shown to a user across multiple client devices.

Turning now to FIG. 3, illustrated is an exemplary system 300 for dynamically governing a frequency at which inquiries are successively shown to a user 144 across multiple client devices 102. In various implementations, the frequency may be governed based on user activity 142 that occurs within an application(s) 104 at a single one of the client devices 102. As illustrated, the system 300 includes a first client device 102(1) having an instance of a first application 104(1) and a second client device 102(2) having another instance of the first application 104(1) as well as an instance of an N-th application 104(N). Each of the applications 104 include various components discussed with relation to FIG. 1 such as, for example, an inquiry engine 106, an inquiry governor 116, an inquiry user experience 120, and/or one or more functionality modules 122. The inquiry engine 106 at any particular application 104 may obtain inquiry data that defines one or more inquiries and associated parameters (e.g., trigger criteria 132, classifier data 135, and/or priority data 136). It can be appreciated that FIG. 3 is similar to FIGS. 1 and 2 with the exception that two or more client devices 102 are shown to communicate with one another based on an inquiry 202 being triggered at one client device 102 of the two or more client devices 102 illustrated.

In the illustrated scenario, an inquiry engine 106(1) that is operating on the first client device 102(1) in association with the first application 104(1) analyzes user activity 142 being performed with respect to one or more first functionality modules 122(1). Upon determining that trigger criteria have been satisfied for a particular inquiry 202, the particular inquiry 202 is routed through an inquiry governor 116(1) that is operating on the first client device 102(1) in association with the first application 104(1). In the illustrated example, the particular inquiry 202 is routed through a channel 118 at the inquiry governor 116(1) and ultimately exposed to the user 144. It can be appreciated that in other implementations, the inquiry governor 116(1) may lack specific channels as defined herein and may govern the frequency with which inquiries are shown to the user 144 based on classifiers associated with individual inquiries. As a result of the particular inquiry 202 being shown to the user 144 at the first client device 104(1), the instance of the inquiry governor 116(1) at the first client device 104(1) may prevent other inquiries that are associated with similar classifiers and/or designate similar channels from being exposed to the user for at least a minimum "cool-off" duration of time.

As another result of the particular inquiry 202 being shown to the user 144 at the first client device 104(1), the instance of the inquiry governor 116(1) at the first client device 104(1) may pass one or more channel sync instructions 204 to one or more other applications 104 residing on other client devices 102. In the illustrated example, the first client device 102(1) is shown to transmit a first channel sync instruction 204(1) to an instance of the first application 104(1) residing on the N-th client device 102(N). As further illustrated, the first client device 102(1) transmits an N-th channel sync instruction 204(N) to an instance of the N-th application 104(N) also residing on the N-th client device 102(N). Responsive to the channel sync instructions 204, the instances of the first application 104(1) and the N-th application 104(N) residing on the N-th client device 104(N) may prevent other inquiries that are associated with similar classifiers and/or designate similar channels from being exposed to the user at the N-th client device 102(N) for at least the minimum "cool-off" duration of time.

As described with relation to FIG. 2, in some embodiments, the channel sync instruction(s) 204 may be relayed through one or more servers such as, for example, the inquiry server 128 prior to reaching the N-th application 104(N). For example, as illustrated the N-th channel sync instruction 204(N) is relayed through the inquiry server 128 prior to reaching the N-th application 104(N) on the N-th client device 102(N). In some implementations, the client device(s) 102 may be configured to communicate directly (e.g., peer-to-peer) without reliance on the inquiry server 128. For example, as illustrated the first channel sync instruction 204(1) is passed directly to the first application 104(1) on the N-th client device 102(N) without being routed through the inquiry server.

It can be appreciated that the embodiment described in relation to FIG. 3 may be beneficial for deployment across multiple client devices onto which a user 144 has installed instances of productivity applications of a productivity suite. For example, some productivity suites allow for users 144 to install provided productivity applications on up to a certain number of the user's personal and/or business devices. In this way, if the user 144 is asked a particular question on the first device 102(1) based on certain user activity, that user 144 will not again be bothered with the same particular question when that certain user activity is again performed on a different client device.

Turning now to FIG. 4A, exemplary inquiry data 400 is shown that is usable according to the techniques described herein for governing a frequency at which inquiries are successively shown at a client device 102 as trigger criteria 132 are satisfied for multiple ones of the inquiries.

In some implementations, the inquiry data 400 includes isolated inquiry data 402 defining one or more isolated inquiries that are not designated to be displayed in sequence with any other inquiries defined by the inquiry data 400. As illustrated, the inquiry data 400 includes isolated inquiry data 402 that defines four ("4") isolated inquiries and various parameters associated with these isolated inquiries. Additionally or alternatively, the inquiry data 400 may include campaign inquiry data 404 defining one or more campaign inquiries that are designated to be displayed in sequence with one or more other inquiries defined by the inquiry data 400. As illustrated, the inquiry data 400 includes campaign inquiry data 404 that defines four ("4") campaign inquiries and various parameters associated with these campaign inquiries. In some embodiments, parameters associated with isolated inquiries may be the same as and/or differ from parameters associated with campaign inquiries.

In some implementations, the various parameters include unique identifiers corresponding to individual inquiries defined by the inquiry data 400. In the illustrated example, each individual inquiry includes a corresponding inquiry ID. Referring back now to FIG. 1, it can be appreciated that since the inquiry data 400 is in some embodiments redundantly stored on the inquiry server 128, the response data 140 does not need to fully define any particular inquiry. In particular, the response data may include user input defining the user's response to any particular inquiry and may associate that response data with the inquiry ID for that particular inquiry. Accordingly, it can be appreciated that deploying the techniques herein reduces network bandwidth by minimizing the size of the response data 140 as opposed to current applications.

In some implementations, the various parameters include threshold criteria for determining whether any particular inquiry is applicable to any particular user. As illustrated, seven ("7") inquiries of the eight ("8") inquiries are shown to include threshold criteria. More specifically, the only inquiry which does not include threshold criteria is inquiry "ID_1." Thus, when deploying the techniques described herein using the exemplary inquiry data 400, inquiry "ID_1" is applicable to all users. As further illustrated, seven ("4") inquiries of the eight ("8") inquiries are shown to include a probability function 126 as threshold criteria. For example, as described herein, the system 100 may deploy the probability function 126 to determine whether the campaign inquiry data 404 is to be applied to any particular user. As further illustrated, seven ("3") inquiries of the eight ("8") inquiries are shown to include threshold criteria making them applicable only to users that have not been selected to have a campaign run against them. For example, when the probability function 126 does not result in a particular user being selected for the campaign inquiry data 404, then the isolated inquiry data 402 is applied to that particular user.

In some implementations, the various parameters include priorities that indicate an importance of receiving user input in association with individual inquiries. As illustrated, the inquiry data 400 indicates that the most important inquiry of the eight inquiries shown is inquiry "ID_1." In various implementations, the inquiry data 400 may further indicate a number of times that any particular inquiry can be asked to any particular user. For example, as illustrated, the inquiry data 400 indicates that inquiry "ID_1" may be asked of any particular user an unlimited amount of times (e.g., the priority parameters indicate a priority of ten ("10") and "No Ask Limit" for inquiry"ID_1".) As further illustrated, the inquiry data 400 indicates that inquiry "ID 3" may only be asked of a particular user three ("3") times. In various implementations, the inquiry data 400 may at least partially indicate an order in which two or more inquiries are to be exposed (e.g., visibly and/or audibly) to a user. For example, as illustrated, the inquiry data 400 defines a sequence of campaign inquiries by indicating that inquiry "CI_1" is to be shown before any of the other campaign inquiries. As further illustrated, the inquiry data 400 indicates that the inquiry "CI_1" is the last inquiry to be shown as part of this particular campaign. As further illustrated, the two remaining inquiries of the campaign can be shown in any order so long as they are not shown first or last during the campaign.

In some implementations, the various parameters include classifier values for individual inquiries. As illustrated, the inquiry data 400 indicates a classifier value of two ("2") for inquiry "ID_1" and a classifier value of one ("1") for inquiries "ID_2," "ID_3," and "ID_4." As further illustrated, the inquiry data 400 indicates a classifier value of N for the inquiries included within the campaign inquiry data 404.

In some implementations, the inquiry data 400 defines trigger criteria for triggering exposure of individual inquiries of the plurality of inquiries. In various implementations, the trigger criteria may be specifically associated with the user activity 142. For example, as illustrated inquiry "ID_2" is triggered by some predefined user action "A," whereas inquiry "ID_3" is triggered by some predefined user action "B," and so on. In various implementations, the trigger criteria may be specifically associated with system activity. For example, as illustrated inquiry "ID_1" is triggered by an application crash event. In some implementations, the trigger criteria may correspond to a combination of system activity and/or user activity. For example, as illustrated, inquiry "CI_1" is triggered based on a user activating the application (e.g., installing and registering the application) and then subsequently being launched at least three days after the user activating the application.

In some implementations, the inquiry data 400 defines whether a "cool-off" duration is applicable to individual inquiries and, if so, a length of the "cool-off" duration for individual inquiries. As illustrated, inquiry "ID_1" does not have a "cool-off" duration and, therefore, can be sequentially asked of a particular user whenever the application crashes. As further illustrated, inquiry "CI_1" does not have a "cool-off" duration because it is the last inquiry within the campaign sequence. The inquiry data 400 defines for each remaining inquiry a predefined duration of time that must pass after each inquiry is exposed to the user before a subsequent inquiry that is marked with the same classifier value is permitted to be subsequently shown to the same user.

In some implementations, the inquiry data 400 further includes inquiry text and/or potential responses for the user to select. As illustrated, the inquiry data 400 defines a specific question to present to the user upon the trigger criteria being satisfied for a particular inquiry and also two or more potential responses for the user to select.

Figure 4B:
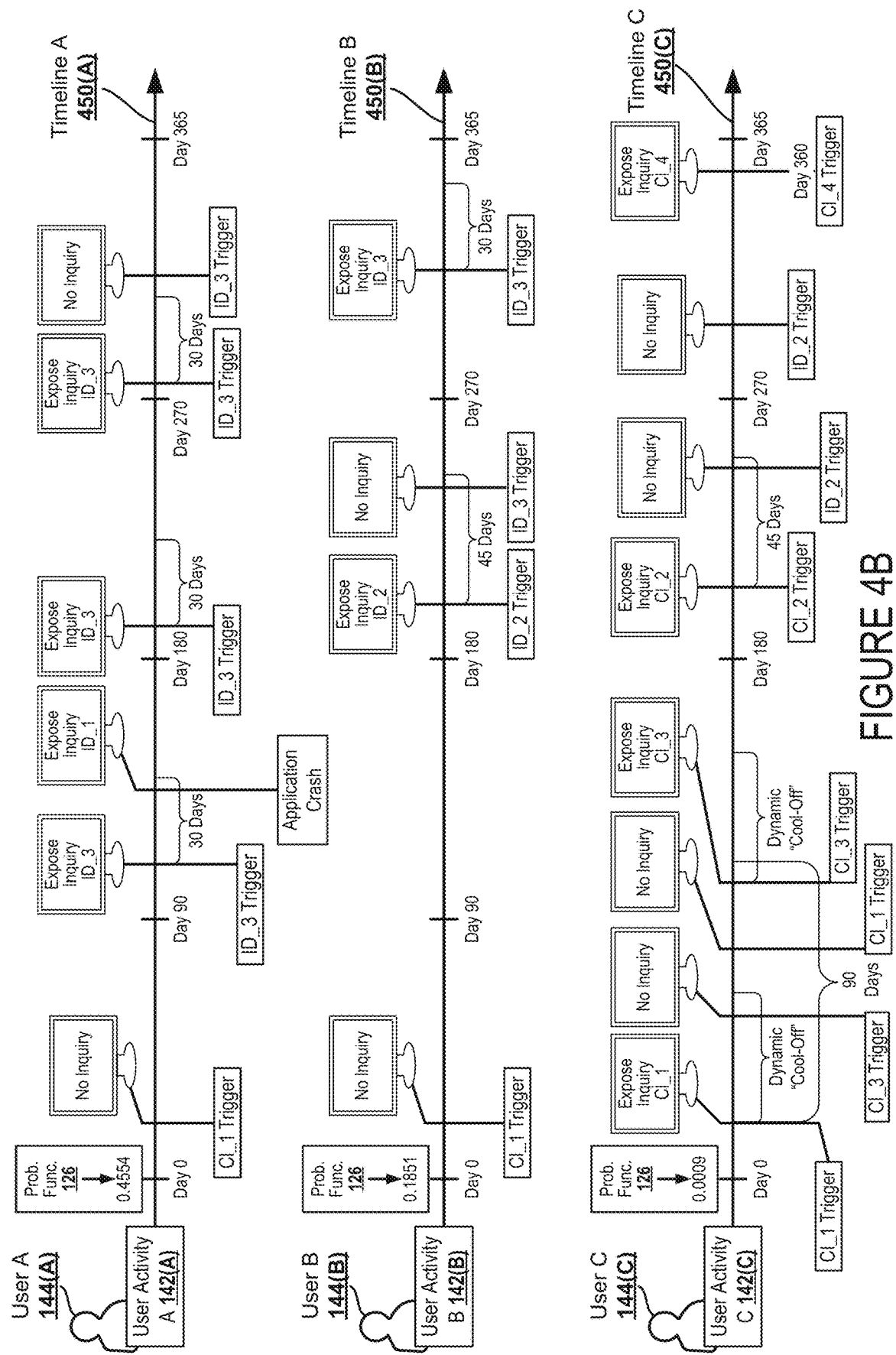
FIG. 4B illustrates exemplary timelines which are shown to demonstrate how applying the inquiry data of FIG. 4A to various user activity scenarios may result in various inquiries being shown and/or not shown to users.

Turning now to FIG. 4B, exemplary timelines 450 are shown to demonstrate how applying the inquiry data 400 of FIG. 4A to various user activity scenarios can result in various inquiries being shown and/or not shown to users. More specifically, Timeline A 450(A) corresponds to the user activity A 142(A) performed by user A 144(A), Timeline B 450(B) corresponds to the user activity B 142(B) performed by user B 144(B), and Timeline C 450(C) corresponds to the user activity C 142(C) performed by user C 144(C). It can be appreciated that each Timeline 450 is described with reference to the inquiry data 400 shown in FIG. 4A.

Referring now to Timeline A 450(A), at day zero the system 100 deploys the probability function 126 to determine whether to apply the campaign inquiry data 404 to user A 144(A). In the specific illustrated example, because the probability function returns a value greater than "0.001" the system determines not to apply the campaign inquiry data 404 to user A 144(A). Thus, even though the trigger criteria are met for the inquiry "CI_1" shortly after day zero, as illustrated, no inquiry is displayed to the user based on these trigger criteria being met. With reference to the threshold criteria outlined in the inquiry data 400, because the campaign has not been selected, inquiries "ID_1" through "ID_3" become applicable to user A 144(A). As illustrated, the trigger criteria are met for the inquiry "ID_3" shortly after day ninety ("90"). Resultantly, the inquiry text associated with inquiry "ID_3" is shown to the user and the thirty day "cool-off" duration is initiated with respect to other inquiries designated with the same classifier as inquiry "ID_3." As illustrated, the trigger criteria are met for the inquiry "ID_1" during the thirty day "cool-off" duration. However, since the classifier value for inquiry "ID_1" is not the same as the classifier value for the inquiry "ID_3," the pending thirty day "cool-off" duration is inapplicable to inquiry "ID_1." Thus, the application crash causes the user to be asked whether system data can be collected to help prevent future application crashes (e.g., the user is shown inquiry text for inquiry "ID_1").

As further illustrated in Timeline A 450(A), the trigger criteria are met for the inquiry "ID_3" three additional times.

However, since the Priority Data for inquiry "ID_3" explicitly indicates that this inquiry can be asked of a particular user up to but no more than three times, the fourth time that the trigger criteria for inquiry "ID_3" are met, no inquiry is displayed to the user despite no "cool off" duration currently being active.

Referring now to Timeline B 450(B), at day zero the system 100 deploys the probability function 126 and determines not to apply the campaign to user B 144(B). As illustrated, the trigger criteria are met for the inquiry "ID_2" shortly after day one-hundred and eighty ("180"). Resultantly, the inquiry text associated with inquiry "ID_2" is shown to the user and the forty ("40") day "cool-off" duration is initiated with respect to other inquiries designated with the same classifier as inquiry "ID_2." Therefore, no inquiry is shown to the user when the trigger criteria are subsequently met for the inquiry "ID_3" during the forty ("40") day "cool-off" duration that resulted from inquiry "ID_2" being shown to the user. However, when the trigger criteria are again subsequently met for the inquiry "ID_3" outside of the forty ("40") day "cool-off" duration, the inquiry text associated with inquiry "ID_3" is shown to the user and a thirty ("30") day "cool-off" duration is initiated with respect to other inquiries designated with the same classifier as inquiry "ID_3."

Referring now to Timeline C 450(C), at day zero the system 100 deploys the probability function 126 and determines to apply the campaign to user C 144(C). In the specific illustrated example, because the probability function returns a value less than "0.001," the system determines to apply the campaign inquiry data 404 to user C 144(C). Thus, when the trigger criteria are met for the inquiry "CI_1" shortly after day zero, the inquiry text associated with inquiry "CI_1" is shown to the user and the ninety ("90") day "cool-off" duration is initiated with respect to other inquiries designated with a classifier value of "N." In some embodiments, the system may prevent any inquiries from being shown within the a particular "cool-off" period. For example, depending on configuration parameters defined within the inquiry data, the system may prevent the user C 144(C) from seeing any inquiries during the entire predetermined ninety ("90") day "cool-off" duration.

In some implementations, trigger criteria being met for any particular inquiry may initiate multiple overlapping "cool-off" periods which may each be applicable to different sets of inquiries. For example, as illustrated, when the trigger criteria for the inquiry "CI_1" are met both of a dynamic "cool-off" period and a predetermined ninety ("90") day "cool-off" duration are triggered. During the dynamic "cool-off" period, the system may prevent the user from being shown a first set of inquiries (e.g., all inquiries and/or a predetermined subset of inquiries). As a more specific but non-limiting example, the dynamic "cool-off" period may be applicable all inquiries while the predetermined ninety ("90") day "cool-off" duration may be exclusively applicable to the inquiry which triggered that "cool-off" period. For example, when the trigger criteria for inquiry "CI 3" are met within this dynamic "cool-off" period the user is not bothered with any inquiry text whereas when the same trigger criteria occur after the dynamic "cool-off" period has ended but within the ninety ("90") day "cool-off" duration, the user is shown the inquiry text associated with inquiry "CI_3." In contrast, when the trigger criteria for inquiry "CI_1" are met after the dynamic "cool-off" period has expired but within the ninety ("90") day "cool-off" duration, the user is not shown any inquiry text. Thus, it can be appreciated that in the immediate example, the dynamic "cool-off" period is applicable to both the inquiry "CI_1" and the inquiry "CI_3" whereas the ninety ("90") day "cool-off" duration is applicable only to the inquiry "CI_1."

With particular reference to the dynamic "cool-off" periods, in some implementations, the "cool-off" duration is determined dynamically after it is initiated. For example, the "cool-off" duration may be based on how many hours a user actually uses the application 104 verses a number of days that pass from an inquiry being shown. In this way, if a user is bothered by an inquiry and then subsequently refrains from using the application for an extended period of time, that user will not immediately be bothered by another inquiry the next time the application is used. With particular reference to the inquiry data shown in FIG. 4A, the "cool-off" duration for inquiry "CI_3" is set to twenty ("20") hours of application use so that the user must actually use the application for this amount of time before an inquiry is shown again regardless of how many days pass since a previous inquiry was shown.

Subsequent to the dynamic "cool-off" duration expiring, trigger criteria for inquiry "CI_2" are met resulting in another "cool-off" duration being initiated. As illustrated, since the campaign data 404 being applied to the user C 144(C) results in the isolated inquiry data 402 being inapplicable to the user C 144(C) (e.g., due to the probability function 126 not selecting user C 144(C) for the campaign), trigger criteria being met for inquiry "ID_2" during or outside of "cool-off" durations on timeline C 450(C) is immaterial to whether corresponding inquiry text is displayed. In other implementations, however, the trigger criteria being met for inquiry "ID_2" outside of "cool-off" durations on timeline C 450(C) may result in the inquiry text for this inquiry to be shown to the user. For example, although the exemplary inquiry data 400 indicates that the inquiries "ID_2" through "ID_4" only apply to user that are not selected for the campaign inquiries based on the probability function 126, in other implementations the inquiries "ID_2" through "ID_4" may be applicable to any particular user regardless of whether that user has been also selected for the campaign inquiries.

Figure 5:
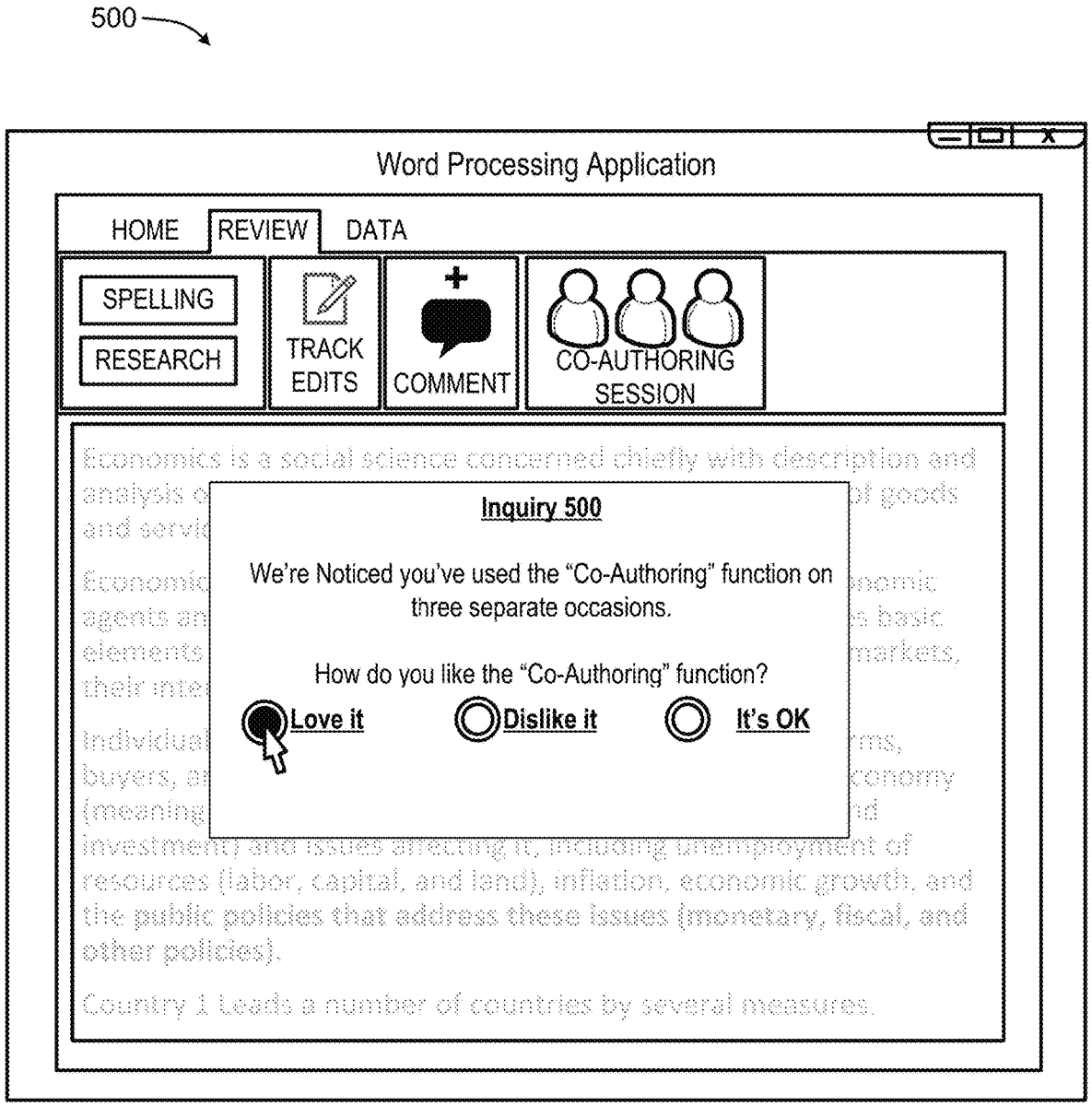
FIG. 5 is a screenshot of an exemplary inquiry that can be displayed to a user in response to trigger criteria being met for a particular inquiry.

FIG. 5 is a screenshot of an exemplary inquiry 500 that can be displayed to a user 144 in response to trigger criteria 132 being met for a particular inquiry. The illustrated example corresponds to inquiry "ID_3" as defined by the inquiry data 400. Although shown in the form of a "pop-up" survey, it can be appreciated that exemplary inquiry 500 is for illustrative purposes only and that numerous other types of inquiries are within the scope of the present disclosure. In some implementations, trigger criteria 132 for the particular inquiry may include a user performing a particular action a certain number of times. For example, as illustrated, inquiry 500 indicates that the user has now used a "Co-Authoring" function on three separate occasions. Accordingly, as a result of the user deploying this particular functionality on enough occasions to have become familiar with and formed opinions with respect to this particular functionality, the system 100 may determine it to be an appropriate time to ask the user how he or she likes this particular functionality.

Figure 6:
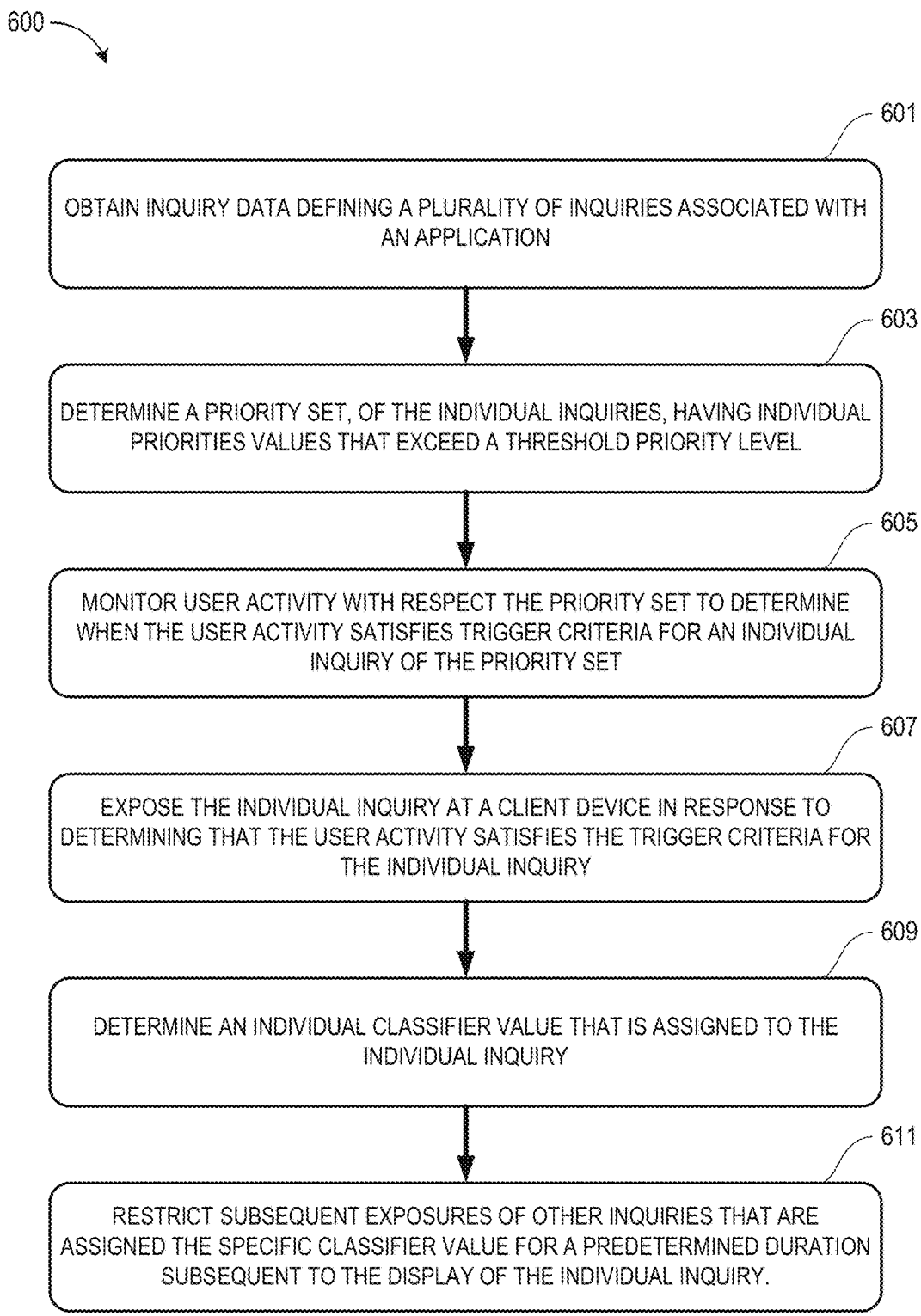
FIG. 6 is a flow diagram of an example method for governing a frequency at which inquiries are successively shown at a client device.

FIG. 6 is a flow diagram of an example method 600 for governing a frequency with which inquiries are successively shown at a client device. The process 600 is described with reference to FIGS. 1-5. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 601, inquiry data may be obtained that defines a plurality of inquiries associated with an application. As described above, the inquiry data may include one or both of dynamic inquiry data 130 or static inquiry data 123. In various implementations, a probability function 126 may be deployed to determine whether individual inquiries defined by the inquiry data are to be applied to any particular user. The inquiry data may also define various parameters for individual inquiries such as, for example, trigger criteria for determining when to display individual inquiries, classifier data for determining when to prevent display of individual inquiries even when corresponding trigger criteria have been satisfied, and/or priority data indicating an importance of receiving user input in association with individual inquiries.

At block 603, a priority set may be determined by identifying individual inquiries of the plurality of inquiries having individual priority values that exceed a threshold priority level. For example, the priority set may be determined to include only inquiries having a priority value equal to the highest priority value defined within the inquiry data. As another example, the priority set may be determined based upon a user's experience with subject matter of a particular inquiry. For example, an inquiry having a relatively low priority as defined within the inquiry data may have the priority increased with respect to one user in particular based on a determination that this user is particularly well-suited to provide user input in association with this inquiry.

At block 605, user activity may be monitored with respect to the priority set to determine when the user activity satisfies trigger criteria for an individual inquiry of the priority set. As a specific but nonlimiting example, the system may determine that the user has deployed a particular functionality module for a third time and/or that a user has launched an application that has yet to be renewed within a particular period towards the end of a licensed term.

At block 607, the individual inquiry may be exposed to the user responsive to the trigger criteria being satisfied. For example, the individual inquiry may be graphically displayed to the user in a pop-up notification having one or more user input elements to enable the user to respond to the inquiry. As another example, the individual inquiry may be audibly played to the user and a microphone may be activated to receive audible user input (e.g., a user's voice).

At block 609, an individual classifier value may be determined for the individual inquiry. For example, the system may analyze classifier data 135 associated with the individual inquiry to determine a specific classifier value of the individual inquiry, wherein the specific classifier value is shared with one or more other inquiries.

At block 611, subsequent exposures of other inquiries that are also assigned the specific classifier value may be prevented for at least a predetermined duration of time subsequent to the individual inquiry being exposed at block 607. For example, the system may identify classifier values for any other inquiry that is triggered during a predetermined "cool-off" duration and prevent specific inquiries from being shown to the user when those inquiries are assigned the specific classifier value assigned to a previously exposed inquiry for which the predetermined "cool-off" duration is active.

In some embodiments, the techniques disclosed herein can govern the display of inquiries across different applications. For instance, when user activity causes the display of an inquiry, a system can determine when an inquiry of another application has been displayed. The inquiry of the other application can be in a similar category, e.g., channel, or based on a separate category. The system can then restrict the display of the inquiry for at least a predetermined time period from when the inquiry of the second application was displayed.

In addition, the techniques disclosed herein can govern the display of inquiries across different components of an application. For instance, when user activity causes the display of an inquiry, a system can determine when an inquiry of another application component has been displayed. The inquiry of the other application component can be in a similar category, e.g., channel, or based on a separate category. The system can then restrict the display of the inquiry for at least a predetermined time period from when the inquiry of the second application component was displayed. In these examples, applications or application components can communicate with one another to coordinate and govern the display of inquiries.

Although the present disclosure illustrates examples using inquiries, it can be appreciated that notifications can be displayed in response to user activity or other computer activity that satisfies criteria related to a notification. Thus, messages or other forms of communication can be automatically displayed to a user and governed by the techniques disclosed herein. Such notifications can solicit user response or provide a message or other form of a notification that does not solicit a user response.

Figure 7:
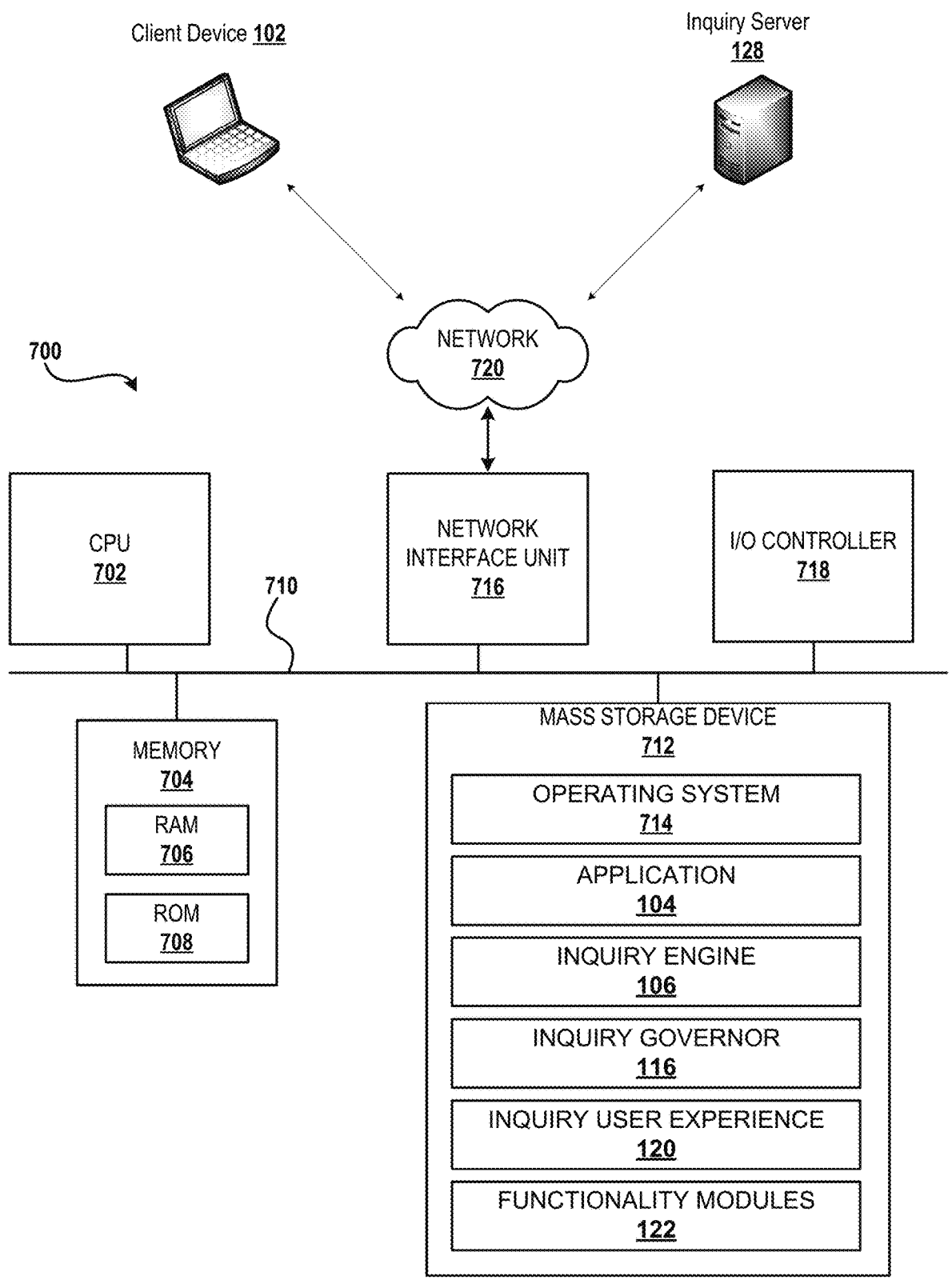
FIG. 7 shows additional details of an example computer architecture for a computer capable of executing the techniques disclosed herein.

FIG. 7 shows additional details of an example computer architecture 700 for a computer capable of executing the application 104, the inquiry engine 106, the inquiry governor 116, the inquiry user experience 120, the functionality modules 122, and/or any program components thereof as described herein. Thus, the computer architecture 700 illustrated in FIG. 7 illustrates an architecture for a client device, a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 714, other data, and one or more application programs. The mass storage device 712 may further include one or more of the application 104, the inquiry engine 106, the inquiry governor 116, the inquiry user experience 120, and/or the functionality modules 122.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 850 and/or another network (not shown). The computer architecture 700 may connect to the network 850 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 720 through a network interface unit 716, the computing architecture may enable the client device 102 to communicate with the inquiry server 128.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

EXAMPLE CLAUSES

The disclosure presented herein may be considered in view of the following clauses.

Example Clause A, a computer-implemented method for enabling a device to govern the frequency with which individual inquiries regarding an application are displayed to a user, the computer-implemented method comprising: obtaining inquiry data defining a plurality of inquiries associated with the application, trigger criteria defining user activity that triggers the display of individual inquiries of the plurality of inquiries, wherein the individual inquiries are each associated with an inquiry classifier value; monitoring, at the device, user activity to determine when the user activity satisfies the trigger criteria for a first inquiry of the plurality of inquiries; responsive to determining that the user activity satisfies the trigger criteria for the first inquiry, causing a display of the first inquiry at the device in association with the application; and responsive to determining that the user activity satisfies the trigger criteria for a second inquiry within a predetermined duration from the first inquiry, restricting a display of the second inquiry when the second inquiry has the same inquiry classifier value as the first inquiry.

Example Clause B, the computer-implemented method of Example Clause A, further comprising: obtaining priority data indicating an importance of receiving user input in association with the individual inquiries, generating, based on the priority data, a priority set of inquiries having individual priorities that exceed a threshold priority level; and selecting individual inquiries from the plurality of inquiries for display to the user based on the priority set of inquiries.

Example Clause C, the computer-implemented method of Example Clause B, further comprising: determining, based at least in part on the user activity, an experience level of the user with respect to a functionality module that corresponds to the first inquiry, wherein generating the priority set of inquiries is further based on the experience level of the user with respect to the functionality module.

Example Clause D, the computer-implemented method of any one of Example Clauses A through C, wherein obtaining the inquiry data includes at least obtaining campaign inquiry data corresponding to an inquiry campaign that includes a sequence of campaign inquiries that are designed for exposure in an at least partially predetermined order, and wherein the predetermined duration indicates a predetermined maximum rate for exposing individual campaign inquiries of the sequence of campaign inquiries.

Example Clause E, the computer-implemented method of any one of Example Clauses A through D, wherein obtaining the inquiry data includes at least obtaining campaign inquiry data corresponding to an inquiry campaign that includes a recurring campaign inquiry, and wherein the predetermined duration indicates a predetermined maximum rate for re-exposing the recurring campaign inquiry.

Example Clause F, the computer-implemented method of any one of Example Clauses A through E, wherein determining that the user activity satisfies the trigger criteria for the first inquiry includes determining that the user activity indicates that an individual functionality module of the application has been used for at least one of a predetermined aggregate amount of time or a predetermined number of times.

Example Clause G, the computer-implemented method of any one of Example Clauses A through F, further comprising: determining when an inquiry of a second application has been displayed; and restricting the display of the first inquiry for at least a predetermined time period from the display of the inquiry of the second application.

Example Clause H, the computer-implemented method of any one of Example Clauses A through G, wherein the individual classifier value indicates an individual channel, of one or more channels, that are usable to display the individual inquiries, that is designated for displaying both the first inquiry and the second inquiry; and wherein the preventing the subsequent display of the second inquiry includes locking the individual channel for the predetermined duration subsequent to the display of the first inquiry.

While Example Clauses A through H are described above with respect to a method, it is understood in the context of this document that the subject matter of Example Clauses A through H can also be implemented by a device, by a system, and/or via computer-readable storage media.

Example Clause I, a client device comprising: one or more processors; a memory in communication with the one or more processors, the memory having computer-readable instructions stored thereupon which, when executed by the one or more processors, cause the client device to: obtain inquiry data defining a plurality of inquiries associated with an application, the inquiry data defining trigger criteria associated with triggering displays of individual inquiries in association with the application, the inquiry data further defining classifier values for governing a frequency of the displays of the individual inquiries; determine a priority set, of the individual inquiries, having individual priorities values that exceed a threshold priority level; monitor, at the client device, user activity with respect to the priority set to determine when the user activity satisfies the trigger criteria for an individual inquiry of the priority set; cause a display of the individual inquiry at the client device in response to determining that the user activity satisfies the trigger criteria for the individual inquiry; determine, based on the inquiry data, an individual classifier value that is assigned to the individual inquiry; and based on another inquiry of the priority set also being assigned the individual classifier value, restrict a subsequent display of the other inquiry when other trigger criteria for the other inquiry are satisfied within a predetermined duration subsequent to the display of the individual inquiry.

Example Clause J, the client device of Example Clause I, wherein the computer-readable instructions further cause the client device to: receive dynamic inquiries, associated with the application, from an inquiry server after the application is installed onto the client device; and obtain static inquiries, associated with the application, that are written to the client device when the application is installed onto the client device.

Example Clause K, the client device of any of Example Clauses I though J, wherein the inquiry data includes campaign inquiry data corresponding to an inquiry campaign that includes a sequence of campaign inquiries that are designed for exposure in a predetermined order over a campaign duration.

Example Clause L, the client device of any of Example Clauses I though K, wherein the computer-readable instructions further cause the client device to select the user for exposure to the inquiry campaign based on a probability function.

Example Clause M, the client device of any of Example Clauses I though L, wherein the computer-readable instructions further cause the client device to determine an experience level of the user with respect to at least one of the application or an individual functionality module of the application, wherein the priority set is determined based at least in part on the experience level of the user.

Example Clause N, the client device of any of Example Clauses I though M, wherein restricting the subsequent display of the other inquiry includes: restricting the subsequent display of the other inquiry at the client device in association with the application that corresponds to the user activity; restricting the subsequent display of the other inquiry at the client device in association with at least one other application; and restricting the subsequent display of the other inquiry at a second client device in association with at least one of the application or the at least one other application.

Example Clause O, the client device of any of Example Clauses I though N, wherein the individual classifier value indicates an individual channel, of one or more channels that are usable to display the individual inquiries, that is designated for displaying both the individual inquiry and the other inquiry; wherein restricting the subsequent display of the other inquiry includes at least one of: locking the individual channel at the client device in association with the application that corresponds to the user activity; locking the individual channel at the client device in association with at least one other application; or locking the individual channel at a second client device in association with at least one of the application or the at least one other application.

Example Clause P, the client device of any of Example Clauses I though O, wherein the individual inquiry corresponds to a first functionality module of the application that enables the user to perform a first function, and wherein the other inquiry corresponds to a second functionality module of the application that enables the user to perform a second function that is different than the first function.

While Example Clauses I through P are described above with respect to a device, it is understood in the context of this document that the subject matter of Example Clauses I through P can also be implemented by a system, via a computer-implemented method, and/or via computer-readable storage media.

Example Clause Q, system comprising: one or more processors; a memory in communication with the one or more processors, the memory having computer-readable instructions stored thereupon which, when executed by the one or more processors, cause the client device to: obtain inquiry data defining a plurality of inquiries associated with an application, the plurality of inquiries including at least: a first inquiry having first trigger criteria associated with using a first functionality module of the application; and a second inquiry having second trigger criteria associated with using a second functionality module of the application; obtain classifier data defining classifier values for governing a frequency with which the plurality of inquiries are displayed in association with the application, wherein each of the first inquiry and the second inquiry are marked with a particular classifier value; monitor user activity to determine when the user activity is associated with the first functionality module and satisfies the first trigger criteria; and responsive to determining that the user activity satisfies the first trigger criteria associated with using the first functionality module: cause a display of the first inquiry at a client device in association with the application; and restrict a subsequent display of the second inquiry when the second trigger criteria associated with the second functionality module are satisfied within a predetermined duration subsequent to the display of the first inquiry.

Example Clause R, the system of Example Clause Q, wherein the computer-readable instructions further cause the client device to: determine an experience level of a user with respect to the first functionality module; and unlock the first inquiry with respect to the user based on the experience level of the user with respect to the first functionality module.

Example Clause S, the system of any of Example Clauses Q through R, wherein each of the first inquiry and the second inquiry correspond to an inquiry campaign that includes a sequence of campaign inquiries that are designed for exposure in a predetermined order, and wherein the inquiry campaign indicates that the first inquiry is to be exposed prior to the second inquiry, wherein the inquiry data defines a campaign expiration causing the system to restrict the display of any inquiry after the campaign expiration has lapsed.

Example Clause T, the system of any of Example Clauses Q through S, wherein the computer-readable instructions further cause the client device to: obtain priority data indicating an importance of receiving user input in association with the plurality of inquiries, and determine, based on the priority data, that the first inquiry is to be displayed prior to the second inquiry.

Example Clause U, the system of any of Example Clauses Q through T, wherein the predetermined duration corresponds to an amount of time a user uses the application subsequent to the display of the first inquiry.

While Example Clauses Q through U are described above with respect to a system, it is understood in the context of this document that the subject matter of Example Clauses Q through U can also be implemented by a device, via a computer-implemented method, and/or via computer-readable storage media.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for enabling a device to govern a frequency with which individual inquiries regarding an application are displayed to a user, the computer-implemented method comprising:
    obtaining inquiry data defining a plurality of inquiries configured to be displayed in association with the application;
    obtaining trigger criteria defining user activity within the application that triggers each inquiry of the plurality of inquiries, wherein each inquiry of the plurality of inquiries is associated with an inquiry classifier value;
    monitoring, at the device, a frequency of use of a function of an application;
    determining that the frequency of use of the function of the application satisfies the trigger criteria for a first inquiry of the plurality of inquiries;
    responsive to determining that the frequency of use of the function of the application satisfies the trigger criteria for the first inquiry, causing a display of the first inquiry at the device in association with the application;
    determining that the frequency of use of the function of the application satisfies the trigger criteria for a second inquiry of the plurality of inquiries that has a same inquiry classifier value as the first inquiry;
    responsive to determining that the frequency of use of the function of the application satisfies the trigger criteria for the second inquiry, determining that a predetermined duration of time since the first inquiry was displayed has not passed; and
    restricting a display of the second inquiry based on the determining that the predetermined duration of time since the first inquiry was displayed has not passed.

2. The computer-implemented method of claim 1, further comprising:
    obtaining priority data indicating an importance of receiving user input in association with the plurality of inquiries,
    generating, based on the priority data, a priority set of inquiries having individual priorities that exceed a threshold priority level; and selecting individual inquiries from the plurality of inquiries for display to the user based on the priority set of inquiries.

3. The computer-implemented method of claim 2, further comprising:
determining, based at least in part on the user activity, an experience level of the user with respect to a functionality module that corresponds to the first inquiry, wherein generating the priority set of inquiries is further based on the experience level of the user with respect to the functionality module.

4. The computer-implemented method of claim 1, wherein obtaining the inquiry data includes at least obtaining campaign inquiry data corresponding to an inquiry campaign that includes a sequence of campaign inquiries that are designed for exposure in an at least partially predetermined order, and wherein the predetermined duration of time indicates a predetermined maximum rate for exposing individual campaign inquiries of the sequence of campaign inquiries.

5. The computer-implemented method of claim 1, wherein obtaining the inquiry data includes at least obtaining campaign inquiry data corresponding to an inquiry campaign that includes a recurring campaign inquiry, and wherein the predetermined duration of time indicates a predetermined maximum rate for re-exposing the recurring campaign inquiry.

6. The computer-implemented method of claim 1, wherein determining that the frequency of use of the function of the application satisfies the trigger criteria for the first inquiry includes determining that the frequency of use of the function of the application indicates that an individual functionality module of the application has been used for at least one of a predetermined aggregate amount of time or a predetermined number of times.

7. The computer-implemented method of claim 1, wherein:
the same inquiry classifier value indicates an individual channel, of one or more channels that are usable to display the plurality of inquiries, that is designated for displaying both the first inquiry and the second inquiry; and
the restricting the display of the second inquiry includes locking the individual channel for the predetermined duration of time.

8. A client device comprising:
one or more processors; and
a memory in communication with the one or more processors, the memory having computer-readable instructions stored thereupon which, when executed by the one or more processors, cause the client device to:
obtain inquiry data defining a plurality of inquiries configured to be displayed in association with an application;
obtaining trigger criteria defining user activity within the application that causes each inquiry of the plurality of inquiries to be displayed wherein each inquiry of the plurality of inquiries is associated with a classifier value for governing a frequency of display;
determine a priority set of inquiries having individual priorities values that exceed a threshold priority level;
monitor, at the client device, a frequency of use of a function of an application;

determine when the frequency of use of the function of the application satisfies the trigger criteria for a first inquiry of the priority set;
cause a display of the first inquiry at the client device in response to determining that the frequency of use of the function of the application satisfies the trigger criteria for the first inquiry;
determine, based on the inquiry data, an individual classifier value that is assigned to the first inquiry; and
based on a second inquiry of the priority set also being assigned the individual classifier value, restrict a subsequent display of the second inquiry when other trigger criteria for the second inquiry are satisfied within a predetermined duration subsequent to the display of the first inquiry.

9. The client device of claim 8, wherein the computer-readable instructions further cause the client device to:
receive dynamic inquiries, associated with the application, from an inquiry server after the application is installed onto the client device; and
obtain static inquiries, associated with the application, that are written to the client device when the application is installed onto the client device.

10. The client device of claim 8, wherein the inquiry data includes campaign inquiry data corresponding to an inquiry campaign that includes a sequence of campaign inquiries that are designed for exposure in a predetermined order over a campaign duration.

11. The client device of claim 10, wherein the computer-readable instructions further cause the client device to select a user for exposure to the inquiry campaign based on a probability function.

12. The client device of claim 8, wherein the computer-readable instructions further cause the client device to determine an experience level of a user with respect to at least one of the application or an individual functionality module of the application, wherein the priority set is determined based at least in part on the experience level of the user.

13. The client device of claim 8, wherein restricting the subsequent display of the second inquiry includes:
restricting the subsequent display of the second inquiry at the client device in association with the application;
restricting the subsequent display of the second inquiry at the client device in association with at least one other application; and
restricting the subsequent display of the second inquiry at a second client device in association with at least one of the application or the at least one other application.

14. The client device of claim 8, wherein:
the individual classifier value indicates an individual channel, of one or more channels that are usable to display the plurality of inquiries, that is designated for displaying both the first inquiry and the second inquiry; and
restricting the subsequent display of the second inquiry includes at least one of:
locking the individual channel at the client device in association with the application;
locking the individual channel at the client device in association with at least one other application; or
locking the individual channel at a second client device in association with at least one of the application or the at least one other application.

15. The client device of claim 8, wherein the first inquiry corresponds to a first functionality module of the application that enables a user to perform a first function, and wherein the second inquiry corresponds to a second functionality module of the application that enables the user to perform a second function that is different than the first function.

16. A system comprising:
    one or more processors;
    a memory in communication with the one or more processors, the memory having computer-readable instructions stored thereupon which, when executed by the one or more processors, cause the client device to:
       obtain inquiry data defining a plurality of inquiries configured to be displayed in association with an application, the plurality of inquiries including at least:
          a first inquiry having first trigger criteria associated with using a first functionality module of the application; and
          a second inquiry having second trigger criteria associated with using a second functionality module of the application;
       obtain classifier data defining classifier values for governing a frequency with which the plurality of inquiries are displayed in association with the application, wherein each of the first inquiry and the second inquiry are marked with a same classifier value;
       monitor user activity to determine when the user activity is associated with the first functionality module and satisfies the first trigger criteria; and
       responsive to determining that the user activity satisfies the first trigger criteria associated with using the first functionality module:
          cause a display of the first inquiry at a client device in association with the application; and
          restrict a subsequent display of the second inquiry when the second trigger criteria associated with the second functionality module are satisfied within a predetermined duration of time subsequent to the display of the first inquiry.

17. The system of claim 16, wherein the computer-readable instructions further cause the client device to:
    determine an experience level of a user with respect to the first functionality module; and
    unlock the first inquiry with respect to the user based on the experience level of the user with respect to the first functionality module.

18. The system of claim 16, wherein each of the first inquiry and the second inquiry correspond to an inquiry campaign that includes a sequence of campaign inquiries that are designed for exposure in a predetermined order, and wherein the inquiry campaign indicates that the first inquiry is to be exposed prior to the second inquiry, wherein the inquiry data defines a campaign expiration causing the system to restrict the display of any inquiry after the campaign expiration has lapsed.

19. The system of claim 16, wherein the computer-readable instructions further cause the client device to:
    obtain priority data indicating an importance of receiving user input in association with the plurality of inquiries, and
    determine, based on the priority data, that the first inquiry is to be displayed prior to the second inquiry.

20. The system of claim 16, wherein the predetermined duration corresponds to an amount of time a user uses the application subsequent to the display of the first inquiry.

* * * * *